United States Patent
Scalisi et al.

(10) Patent No.: US 8,542,113 B2
(45) Date of Patent: Sep. 24, 2013

(54) APPARATUS AND METHOD FOR DETERMINING LOCATION AND TRACKING COORDINATES OF A TRACKING DEVICE

(75) Inventors: Joseph F. Scalisi, Yorba Linda, CA (US); David Butler, Staffordshire (GB); Roger B. Anderson, Arcadia, CA (US); Desiree Mejia, Redondo Beach, CA (US); Michael L. Beydler, Irvine, CA (US)

(73) Assignee: Location Based Technologies Inc., Irvine, CA (US)

( * ) Notice: Subject to any disclaimer, the term of this patent is extended or adjusted under 35 U.S.C. 154(b) by 42 days.

(21) Appl. No.: 13/356,614

(22) Filed: Jan. 23, 2012

(65) Prior Publication Data

US 2013/0120141 A1 May 16, 2013

Related U.S. Application Data

(62) Division of application No. 11/969,905, filed on Jan. 6, 2008, now Pat. No. 8,102,256.

(51) Int. Cl.
*G08B 1/08* (2006.01)

(52) U.S. Cl.
USPC .................................................. 340/539.13

(58) Field of Classification Search
USPC ................... 340/539.13, 539.21, 573.1, 574, 340/573.4, 686.1, 689, 690; 455/522
See application file for complete search history.

(56) References Cited

U.S. PATENT DOCUMENTS

| | | | |
|---|---|---|---|
| 3,924,102 A | 12/1975 | Hanekom | |
| 4,218,582 A | 8/1980 | Hellman et al. | |
| 4,379,334 A | 4/1983 | Feagins, Jr. et al. | |
| 4,807,453 A | 2/1989 | Bernier et al. | |
| 4,850,007 A | 7/1989 | Marino et al. | |
| 4,885,920 A | 12/1989 | Larson | |
| 5,079,541 A | 1/1992 | Moody | |
| 5,127,042 A | 6/1992 | Gillig et al. | |

(Continued)

FOREIGN PATENT DOCUMENTS

| JP | 10325735 | 12/1998 |
|---|---|---|
| JP | 11064480 | 3/1999 |

(Continued)

OTHER PUBLICATIONS

Schuster, Mike et al., "Increasing the Frequency Response of the ADXL Series Accelerometers", *Analog Devices Application Note AN-377*, (Feb. 2006),1 page.

(Continued)

*Primary Examiner* — Phung Nguyen
(74) *Attorney, Agent, or Firm* — Timberline Patent Law Group PLLC

(57) ABSTRACT

A device and method to monitor location coordinates of an electronic tracking device are disclosed here. The device includes circuitry to receive at least one portion of a receive communication signal comprising location coordinates information; accelerometer circuitry to measure differential positioning of the portable electronic tracking device; and a battery power monitor configured to selectively activate and deactivate at least one portion of the transceiver circuitry and location tracking circuitry. The method includes receiving at a portable electronic tracking device at least one portion of a receive communication signal comprising location coordinates information; measuring differential positioning of the portable electronic tracking device; and activating and deactivating at least one portion of the transceiver circuitry and location tracking circuitry.

20 Claims, 3 Drawing Sheets

(56) References Cited

U.S. PATENT DOCUMENTS

| | | | |
|---|---|---|---|
| 5,353,331 | A | 10/1994 | Emery et al. |
| 5,361,612 | A | 11/1994 | Voiculescu et al. |
| 5,386,468 | A | 1/1995 | Akiyama et al. |
| 5,417,092 | A | 5/1995 | Iu |
| 5,432,542 | A | 7/1995 | Thibadeau et al. |
| 5,490,402 | A | 2/1996 | Shieh |
| 5,541,976 | A | 7/1996 | Ghisler |
| 5,555,286 | A | 9/1996 | Tendler |
| 5,563,579 | A | 10/1996 | Carter |
| 5,565,909 | A | 10/1996 | Thibadeau et al. |
| 5,592,173 | A * | 1/1997 | Lau et al. ............ 342/357.74 |
| 5,768,920 | A | 6/1998 | DeBevoise |
| 5,785,181 | A | 7/1998 | Quartararo, Jr. |
| 5,862,511 | A | 1/1999 | Croyle et al. |
| 5,876,765 | A | 3/1999 | Hinterlechner et al. |
| 5,967,841 | A | 10/1999 | Bianca et al. |
| 5,973,599 | A | 10/1999 | Nicholson et al. |
| 6,078,575 | A | 6/2000 | Dommety et al. |
| 6,088,453 | A | 7/2000 | Shimbo |
| 6,141,356 | A | 10/2000 | Gorman |
| 6,236,365 | B1 | 5/2001 | LeBlanc et al. |
| 6,243,039 | B1 | 6/2001 | Elliot |
| 6,278,370 | B1 | 8/2001 | Underwood |
| 6,300,875 | B1 | 10/2001 | Schafer |
| 6,327,533 | B1 | 12/2001 | Chou |
| 6,330,817 | B1 | 12/2001 | Frolov |
| 6,388,612 | B1 | 5/2002 | Neher |
| 6,396,403 | B1 | 5/2002 | Haner |
| 6,414,629 | B1 | 7/2002 | Curcio |
| 6,441,741 | B1 | 8/2002 | Yoakum |
| 6,445,921 | B1 | 9/2002 | Bell |
| 6,453,037 | B1 | 9/2002 | Welter, Jr. |
| 6,498,797 | B1 | 12/2002 | Anerousis et al. |
| 6,546,253 | B1 | 4/2003 | Chow et al. |
| 6,611,755 | B1 | 8/2003 | Coffee et al. |
| 6,633,835 | B1 | 10/2003 | Moran et al. |
| 6,654,883 | B1 | 11/2003 | Tatebayashi |
| 6,674,368 | B2 | 1/2004 | Hawkins et al. |
| 6,708,028 | B1 | 3/2004 | Byrne |
| 6,716,101 | B1 | 4/2004 | Meadows |
| 6,731,212 | B2 | 5/2004 | Hirose et al. |
| 6,732,090 | B2 | 5/2004 | Shanahan et al. |
| 6,735,630 | B1 | 5/2004 | Gelvin et al. |
| 6,747,561 | B1 | 6/2004 | Reeves et al. |
| 6,754,470 | B2 | 6/2004 | Hendrickson et al. |
| 6,768,942 | B1 | 7/2004 | Chojnacki |
| 6,774,797 | B2 | 8/2004 | Freathy et al. |
| 6,774,838 | B2 * | 8/2004 | Sun ............ 342/357.57 |
| 6,778,089 | B2 | 8/2004 | Yoakum |
| 6,812,824 | B1 | 11/2004 | Goldinger et al. |
| 6,819,247 | B2 | 11/2004 | Birnbach et al. |
| 6,833,787 | B1 | 12/2004 | Levi |
| 6,850,252 | B1 | 2/2005 | Hoffberg |
| 6,859,533 | B1 | 2/2005 | Wang et al. |
| 6,879,244 | B1 | 4/2005 | Scalisi |
| 6,882,897 | B1 | 4/2005 | Fernandez |
| 6,928,280 | B1 | 8/2005 | Xanthos et al. |
| 6,937,726 | B1 | 8/2005 | Wang |
| 6,952,181 | B2 | 10/2005 | Karr et al. |
| 6,975,941 | B1 | 12/2005 | Lau |
| 6,978,021 | B1 | 12/2005 | Chojnacki |
| 6,988,026 | B2 | 1/2006 | Breed |
| 6,992,584 | B2 | 1/2006 | Dooley et al. |
| 6,998,985 | B2 | 2/2006 | Reisman et al. |
| 6,998,995 | B2 | 2/2006 | Nakajima |
| 7,019,644 | B2 | 3/2006 | Barrie |
| 7,020,701 | B1 | 3/2006 | Gelvin et al. |
| 7,038,590 | B2 | 5/2006 | Hoffman et al. |
| 7,049,957 | B2 | 5/2006 | Watson |
| 7,064,711 | B2 | 6/2006 | Strickland et al. |
| 7,065,244 | B2 | 6/2006 | Akimov |
| 7,065,348 | B1 | 6/2006 | Aoki et al. |
| 7,065,370 | B2 | 6/2006 | Ogaki et al. |
| 7,079,650 | B1 | 7/2006 | Knudsen |
| 7,088,242 | B2 | 8/2006 | Aupperle et al. |
| 7,088,252 | B2 | 8/2006 | Weekes |
| 7,099,921 | B1 | 8/2006 | Engstrom et al. |
| 7,109,868 | B2 | 9/2006 | Yoakum |
| 7,119,669 | B2 | 10/2006 | Lundsgaard et al. |
| 7,120,928 | B2 | 10/2006 | Sheth et al. |
| 7,139,396 | B2 | 11/2006 | Montgomery et al. |
| 7,146,367 | B2 | 12/2006 | Shutt |
| 7,149,189 | B2 | 12/2006 | Huntington et al. |
| 7,155,238 | B2 | 12/2006 | Katz |
| 7,158,912 | B2 | 1/2007 | Vock et al. |
| 7,181,192 | B2 | 2/2007 | Panasik et al. |
| 7,200,673 | B1 | 4/2007 | Augart |
| 7,218,242 | B2 | 5/2007 | Scalisi et al. |
| 7,246,007 | B2 | 7/2007 | Ferman et al. |
| 7,257,836 | B1 | 8/2007 | Moore |
| 7,268,700 | B1 | 9/2007 | Hoffberg |
| 7,272,212 | B2 | 9/2007 | Eberle et al. |
| 7,272,662 | B2 | 9/2007 | Chesnais et al. |
| 7,284,191 | B2 | 10/2007 | Grefenstette et al. |
| 7,292,223 | B2 | 11/2007 | Suprun et al. |
| 7,299,277 | B1 | 11/2007 | Moran et al. |
| 7,302,634 | B2 | 11/2007 | Lucovsky et al. |
| 7,313,825 | B2 | 12/2007 | Redlich et al. |
| 7,501,952 | B2 | 3/2009 | Forster |
| 7,501,984 | B2 | 3/2009 | Forster et al. |
| 7,571,628 | B2 | 8/2009 | D'Anieri |
| 7,598,855 | B2 | 10/2009 | Scalisi |
| 7,612,663 | B2 * | 11/2009 | Sun ............ 340/539.3 |
| 7,626,499 | B2 | 12/2009 | Burneske et al. |
| 7,693,527 | B2 | 4/2010 | Krstulich |
| 7,728,724 | B1 | 6/2010 | Scalisi et al. |
| 7,742,774 | B2 | 6/2010 | Oh et al. |
| 7,823,073 | B2 | 10/2010 | Holmes et al. |
| 7,823,424 | B2 | 11/2010 | Shabtay et al. |
| 7,831,264 | B2 | 11/2010 | Miegel |
| 7,926,314 | B2 | 4/2011 | Tollefson |
| 7,995,994 | B2 | 8/2011 | Khetawat et al. |
| 8,010,601 | B2 | 8/2011 | Jennings et al. |
| 8,081,072 | B2 | 12/2011 | Scalisi et al. |
| 2001/0030667 | A1 | 10/2001 | Kelts |
| 2001/0048364 | A1 | 12/2001 | Kalthoff et al. |
| 2002/0016189 | A1 * | 2/2002 | Sheynblat et al. ............ 455/574 |
| 2002/0041328 | A1 | 4/2002 | LeCompte et al. |
| 2002/0067256 | A1 | 6/2002 | Kail, IV |
| 2002/0077130 | A1 | 6/2002 | Owensby |
| 2002/0180602 | A1 | 12/2002 | Yoakum |
| 2002/0186135 | A1 | 12/2002 | Wagner |
| 2002/0196123 | A1 | 12/2002 | Diehl et al. |
| 2003/0004776 | A1 | 1/2003 | Perrella et al. |
| 2003/0043200 | A1 | 3/2003 | Faieta et al. |
| 2003/0131073 | A1 | 7/2003 | Lucovsky et al. |
| 2003/0177094 | A1 | 9/2003 | Needham et al. |
| 2003/0208518 | A1 | 11/2003 | Gura et al. |
| 2003/0210262 | A1 | 11/2003 | Gahm et al. |
| 2003/0212729 | A1 | 11/2003 | Eberle et al. |
| 2003/0235307 | A1 | 12/2003 | Miyamoto |
| 2004/0010689 | A1 | 1/2004 | Vanstone et al. |
| 2004/0021573 | A1 | 2/2004 | Hoffman et al. |
| 2004/0165726 | A1 | 8/2004 | Yamamichi et al. |
| 2004/0166879 | A1 | 8/2004 | Meadows et al. |
| 2004/0172403 | A1 | 9/2004 | Steele et al. |
| 2004/0212493 | A1 | 10/2004 | Stilp |
| 2005/0012620 | A1 | 1/2005 | Yoakum |
| 2005/0024201 | A1 | 2/2005 | Culpepper et al. |
| 2005/0044356 | A1 | 2/2005 | Srivastava et al. |
| 2005/0071282 | A1 | 3/2005 | Lu et al. |
| 2005/0071736 | A1 | 3/2005 | Schneider et al. |
| 2005/0099303 | A1 | 5/2005 | Suckerman |
| 2005/0113124 | A1 * | 5/2005 | Syrjarinne et al. ............ 455/522 |
| 2005/0145688 | A1 | 7/2005 | Milenkovic et al. |
| 2005/0159883 | A1 | 7/2005 | Humphries et al. |
| 2005/0181870 | A1 | 8/2005 | Nguyen et al. |
| 2005/0188403 | A1 | 8/2005 | Kotzin |
| 2005/0202830 | A1 | 9/2005 | Sudit |
| 2005/0210260 | A1 | 9/2005 | Venkatesan et al. |
| 2005/0246647 | A1 | 11/2005 | Beam et al. |
| 2005/0248459 | A1 | 11/2005 | Bonalle et al. |
| 2006/0009152 | A1 | 1/2006 | Millard et al. |
| 2006/0084420 | A1 | 4/2006 | Smith et al. |

| | | |
|---|---|---|
| 2006/0161377 A1 | 7/2006 | Rakkola et al. |
| 2006/0176149 A1 | 8/2006 | Douglas |
| 2006/0205416 A1 | 9/2006 | Kayzar et al. |
| 2006/0206246 A1 | 9/2006 | Walker |
| 2006/0211405 A1 | 9/2006 | Scalisi et al. |
| 2006/0223518 A1 | 10/2006 | Haney |
| 2006/0229027 A1 | 10/2006 | Wang et al. |
| 2006/0232449 A1 | 10/2006 | Jain et al. |
| 2006/0253590 A1 | 11/2006 | Nagy et al. |
| 2006/0290497 A1 | 12/2006 | Sugata |
| 2007/0028088 A1 | 2/2007 | Bayrak et al. |
| 2007/0033531 A1 | 2/2007 | Marsh |
| 2007/0053513 A1 | 3/2007 | Hoffberg |
| 2007/0054530 A1 | 3/2007 | Bauer et al. |
| 2007/0057068 A1 | 3/2007 | Tsai |
| 2007/0061303 A1 | 3/2007 | Ramer et al. |
| 2007/0073719 A1 | 3/2007 | Ramer et al. |
| 2007/0083819 A1 | 4/2007 | Shoemaker |
| 2007/0103296 A1 | 5/2007 | Paessel et al. |
| 2007/0159322 A1 | 7/2007 | Campbell |
| 2007/0162304 A1 | 7/2007 | Rodgers |
| 2007/0200695 A1 | 8/2007 | Almstrand et al. |
| 2007/0229350 A1 | 10/2007 | Scalisi et al. |
| 2007/0240212 A1 | 10/2007 | Matalytski |
| 2007/0255620 A1 | 11/2007 | Tumminaro et al. |
| 2007/0279002 A1 | 12/2007 | Partovi |
| 2007/0285247 A1 | 12/2007 | Forster |
| 2007/0287473 A1 | 12/2007 | Dupray |
| 2007/0288427 A1 | 12/2007 | Ramer et al. |
| 2008/0010585 A1 | 1/2008 | Schneider |
| 2008/0021741 A1 | 1/2008 | Holla et al. |
| 2008/0028063 A1 | 1/2008 | Holmes et al. |
| 2008/0030345 A1 | 2/2008 | Austin et al. |
| 2008/0059504 A1 | 3/2008 | Barbetta et al. |
| 2008/0059889 A1 | 3/2008 | Parker et al. |
| 2008/0088437 A1 | 4/2008 | Aninye et al. |
| 2008/0090550 A1 | 4/2008 | Scalisi et al. |
| 2008/0108370 A1 | 5/2008 | Aninye |
| 2008/0109762 A1 | 5/2008 | Hundal et al. |
| 2008/0129491 A1 | 6/2008 | Ruperto et al. |
| 2008/0171559 A1 | 7/2008 | Frank et al. |
| 2008/0172173 A1 | 7/2008 | Chang et al. |
| 2008/0174422 A1 | 7/2008 | Freathy et al. |
| 2008/0224854 A1 | 9/2008 | Furey et al. |
| 2008/0227473 A1 | 9/2008 | Haney |
| 2008/0228654 A1 | 9/2008 | Edge |
| 2008/0252254 A1 | 10/2008 | Osada |
| 2008/0252459 A1 | 10/2008 | Butler et al. |
| 2009/0009398 A1 | 1/2009 | Taylor et al. |
| 2009/0098857 A1 | 4/2009 | De Atley |
| 2009/0098903 A1 | 4/2009 | Donaldson et al. |
| 2009/0103722 A1 | 4/2009 | Anderson et al. |
| 2009/0111393 A1 | 4/2009 | Scalisi et al. |
| 2009/0117921 A1 | 5/2009 | Beydler et al. |
| 2009/0119119 A1 | 5/2009 | Scalisi et al. |
| 2009/0167554 A1 | 7/2009 | Munje et al. |
| 2009/0174603 A1 | 7/2009 | Scalisi et al. |
| 2009/0177385 A1 | 7/2009 | Matas et al. |
| 2009/0189807 A1 | 7/2009 | Scalisi et al. |
| 2009/0201127 A1 | 8/2009 | Stobbe et al. |
| 2009/0315706 A1 | 12/2009 | Scalisi et al. |
| 2009/0315767 A1 | 12/2009 | Scalisi et al. |
| 2010/0073229 A1 | 3/2010 | Pattabiraman et al. |
| 2010/0216487 A1 | 8/2010 | Yamaguchi |
| 2012/0086571 A1 | 4/2012 | Scalisi et al. |
| 2012/0089492 A1 | 4/2012 | Scalisi et al. |
| 2013/0157691 A1 | 6/2013 | Beydler et al. |

FOREIGN PATENT DOCUMENTS

| | | |
|---|---|---|
| JP | 13074494 | 3/2001 |
| KR | 1020020001257 | 1/2002 |
| KR | 1020050063802 | 6/2005 |
| KR | 1005322589 | 11/2005 |
| WO | WO 2007107022 | 9/2007 |

OTHER PUBLICATIONS

Burk, Steve "Overmolding of Embedded Electronics", *Connector Specifier*, Retrieved from the Internet at http:/cs.pennet.com on May 20, 2007,(Apr. 2001),4 pages.

Mannion, Patrick "Antenna Diversity Doubles CDMA Net Capacity", *EE Times*, (May 12, 2003),3 pages.

"Material Property Data for Various Thermoplastic Elastomers", *MATLAB*, (May 29, 2007),7 pages.

Hansen, Michael "Overmolding: A Multifaceted Medical Device Technology", *Medical Device & Diagnostic Industry*, (Jan. 2006),5 pages.

Fredrick, Jonathan D., et al., "Smart Antennas Based on Spatial Multiplexing of Local Elements (SMILE) for Mutual Coupling Reduction", *IEEE Transactions on Antennas and Propagation*, vol. 52, No. 1, (Jan. 2004),pp. 106-114.

Huff, Greg H., et al., "Directional Reconfigurable Antennas on Laptop Computers: Simulation, Measurement and Evaluation of Candidate Integration Positions", *IEEE Transactions on Antenaas*, vol. 52, No. 12, (Dec. 2004),pp. 3220-3227.

Li, Xiaojing et al., "Full-Scale Structural Monitoring Using an Integrated GPS and Accelerometer System", *University of New South Wales*, (Feb. 14, 2006),15 pages.

Li, Xiaojing et al., "The Complementary Characteristics of GPS and Accelerometer in Monitoring Structural Deformation", *Ion 2005 Meeting*, (2005),9 pages.

Lemaire, Christophe "Surface Micromachined Sensors for Vehicle Navigation Systems", Analog Devices, Inc., Retrieved from the Internet from http://www.analog.com/en/content/0,2886,764%255F800%255F8077%255F0,00.html on Dec. 25, 2007.,(Dec. 2007),4 pages.

"ET301 GPS-UAV Developement Platform", (Jul. 12, 2006),11 pages.

"GPS Compass Solution—Application vs. Accuracy", *CEACT Information Systems*, (Sep. 13, 2006),10 pages.

Matsakis, Demetrios "The Timing Group Delay (TGD) Correction and GPS Timing Basis", *Proceedings of the 63rd Annual Meeting of the Institute of Navigation*, Cambridge, MA, (Apr. 2007),6 pages.

"Small and Thin +_5g Accelerometer", *Analog Devices—ADXL320*, (2004),16 pages.

\* cited by examiner

APPARATUS AND METHOD FOR
DETERMINING LOCATION AND TRACKING
COORDINATES OF A TRACKING DEVICE

RELATED APPLICATIONS

This application is a Divisional of, claims priority to, and herein incorporates in its entirety U.S. patent application Ser. No. 11/969,905 filed Jan. 6, 2008 now U.S. Pat. No. 8,102,256.

This application also incorporates by reference in their entirety: U.S. patent application Ser. No. 11/753,979 filed on May 25, 2007, entitled "Apparatus and Method for Providing Location Information on Individuals and Objects Using Tracking Devices"; U.S. patent application Ser. No. 11/933,024 filed on Oct. 31, 2007, entitled "Apparatus and Method for Manufacturing an Electronic Package", U.S. patent application Ser. No. 11/784,400 filed on Apr. 5, 2007, entitled "Communication System and Method Including Dual Mode Capability"; U.S. patent application Ser. No. 11/784,318 filed on Apr. 5, 2007, entitled "Communication System and Method Including Communication Billing Options"; and U.S. patent application Ser. No. 11/935,901 filed on Nov. 6, 2007, entitled "System and Method for Creating and Managing a Personalized Web Interface for Monitoring Location Information on Individuals and Objects Using Tracking Devices."

BACKGROUND OF THE INVENTION

1. Field of the Invention

The invention relates generally to the field of location and tracking communication systems. More particularly, the present invention relates in one embodiment to an accelerometer incorporated as part of portable electronic tracking device for individuals and objects to improve monitoring by a wireless location and tracking system and/or wireless communication system (WCS).

2. Description of Related Technology

Accelerometers are conventionally integrated into electronics systems that are part of a vehicle, vessel, and airplane to detect, measure, and monitor deflections, vibrations, and acceleration. Accelerometers, for example, may include one or more Micro Electro-Mechanical System (MEMS) devices, In particular, MEMS devices include one or more suspended cantilever beams (e.g., single-axis, dual-axis, and three-axis models), as well as deflection sensing circuitry. Accelerometers are utilized by a multitude of electronics manufacturers.

For instance, electronics gaming manufacturers exploit an accelerometer's deflection sensing capability, for instance, to measure device tilt and control game functionality. In another instance, consumer electronics manufacturers, e.g., Apple, Ericsson, and Nike, incorporate accelerometers in personal electronic devices, e.g., Apple iPhone, to provide a changeable screen display orientation that toggles between portrait and landscape layout window settings; to manage human inputs through a human interface, e.g., Apple iPod® touch screen interface; and to measure game movement and tilt, e.g., Wii gaming remotes. Still others including automobile electronics circuitry manufacturers utilize MEMS accelerometers to initiate airbag deployment in accordance with a detected collision severity level by measuring negative vehicle acceleration.

Other electronics manufacturer products, e.g., Nokia 5500 sport, count step motions using a 3D accelerometer, and translate user information via user's taps or shaking motion to select song titles and to enable mp3 player track switching. In another instance, portable or laptop computers include hard-disk drives integrated with an accelerometer to detect displacement or falling incidents. For instance, when a hard-disk accelerometer detects a low-g condition, e.g., indicating free-fall and expected shock, a hard-disk write feature may be temporarily disabled to avoid accidental data overwriting and prevent stored data corruption. After free-fall and expected shock, the hard-disk write feature is enabled to allow data to be written to one or more hard-disk tracks. Still others including medical product manufacturers utilize accelerometers to measure depth of Cardio Pulmonary Resuscitation (CPR) chest compressions. Sportswear manufacturers, e.g., Nike sports watches and footwear, incorporate accelerometers to feedback speed and distance to a runner via a connected iPod® Nano.

Still others including manufacturers of conventional inertial navigation systems deploy one or more accelerometers as part of, for instance, on-board electronics of a vehicle, vessel, train and/or airplane. In addition to accelerometer measurements, conventional inertial navigation systems integrate one or more gyroscopes with the on-board electronics to assist tracking including performing various measurements, e.g., tilt, angle, and roll. More specifically, gyroscopes measure angular velocity, for instance, of a vehicle, vessel, train, and/or airplane in an inertial reference frame. The inertial reference frame, provided, for instance, by a human operator, a GPS receiver, or position and velocity measurements from one or more motion sensors.

More specifically, integration of measured inertial accelerations commences with, for instance, original velocity, for instance, of a vehicle, vessel, train, and/or airplane to yield updated inertial system velocities. Another integration of updated inertial system velocities yields an updated inertial system orientate, e.g., tilt, angle, and roll, within a system limited positioning accuracy. In one instance to improve positioning accuracy, conventional inertial navigation systems utilize GPS system outputs. In another instance to improve positioning accuracy, conventional inertial navigation systems intermittently reset to zero inertial tracking velocity, for instance, by stopping the inertial navigation system. In yet other examples, control theory and Kalman filtering provide a framework to combine motion sensor information in attempts to improve positional accuracy of the updated inertial system orientation.

Potential drawbacks of many conventional inertial navigations systems include electrical and mechanical hardware occupying a large real estate footprint and requiring complex electronic measurement and control circuitry with limited applicability to changed environmental conditions. Furthermore, many conventional inertial navigation system calculations are prone to accumulated acceleration and velocity measurement errors. For instance, many conventional inertial navigations accelerations and velocity measurement errors are on the order of 0.6 nautical miles per hour in position and tenths of a degree per hour in orientation.

In contrast to conventional inertial navigation systems, a conventional Global Positioning Satellite (GPS) system uses Global Positioning Signals (GPS) to monitor and track location coordinates communicated between location coordinates monitoring satellites and an individual or an object having a GPS transceiver. In this system, GPS monitoring of location coordinates is practical when a GPS transceiver receives at least a minimal GPS signal level. However, a minimal GPS signal level may not be detectable when an individual or object is not located in a skyward position. For instance, when an individual or object carrying a GPS transceiver enters a covered structure, e.g., a garage, a parking structure, or a large building, GPS satellite communication signals may be obstructed or partially blocked, hindering tracking and monitoring capability. Not only is a GPS transceiver receiving a weak GPS signal, but also the GPS transceiver is depleting battery power in failed attempts to acquire communications signals from one or more location coordinates monitoring satellites, e.g., GPS satellites, or out-of-range location coordinates reference towers. Furthermore, weak GPS communication signals may introduce errors in location coordinates information.

In summary, electronic tracking device and methodology is needed that provides additional advantages over conventional systems such as improved power management, e.g., efficient use of battery power, and provide other improvements including supplementing conventional electronic tracking device monitoring, e.g., increased measurement accuracy of location coordinates of objects and individuals traveling into and/or through a structure, e.g., a partially covered building, a parking structure, or a substantially enclosed structure, such as a basement or a storage area in a high-rise office building.

SUMMARY OF THE INVENTION

In a first aspect of the present invention, a portable electronic apparatus for a tracking device is disclosed. The electronic apparatus includes a transceiver, an accelerometer, and an antenna. The antenna is disposed on the tracking device. The antenna is configured to communicate signal strength to a signal processor associated with the tracking device. In one variant, responsive to the signal strength, a battery management module (e.g., battery monitor) controls electronic components associated with the tracking device. In one variant, an accelerometer performs an acceleration measurement. In one variant, prior or nearby location coordinates associated with the tracking device are utilized or assist to compute current location coordinates information of the tracking device.

In a second aspect of the present invention, a method is disclosed to communicate location coordinates of a first, tracking device. In this method, a transceiver communicates measured signal strength. In response to measured signal strength level, a power management circuitry (e.g., battery monitor) controls power levels associated with the first tracking device to reduce or increase power consumption of a transceiver and its associated circuitry. In one variant, a user defines a first signal level, e.g., a threshold level, to commence accelerometer measurements. In one variant, if a first signal level is detected, an accelerometer measures displacement from prior location coordinates of the first tracking device. In another variant, if a first signal level is detected, an accelerometer measures relative displacement from prior location coordinates of a second tracking device. In yet another variant, if a first signal level is detected, the relative displacement is utilized to compute current location coordinates information of the first tracking device. In another variant, the accelerometer may be activated to measure impacts of an object or an individual to determine if the object or individual may be medical attention (e.g., be injured).

These and other embodiments, aspects, advantages, and features of the present invention will be set forth in part in the description which follows, and in part will become apparent to those skilled in the art by reference to the following description of the invention and referenced drawings or by practice of the invention. The aspects, advantages and features of the invention are realized and attained by means of the instrumentalities, procedures, and combinations particularly pointed out in the appended claims.

DETAILED DESCRIPTION

Figure 1:
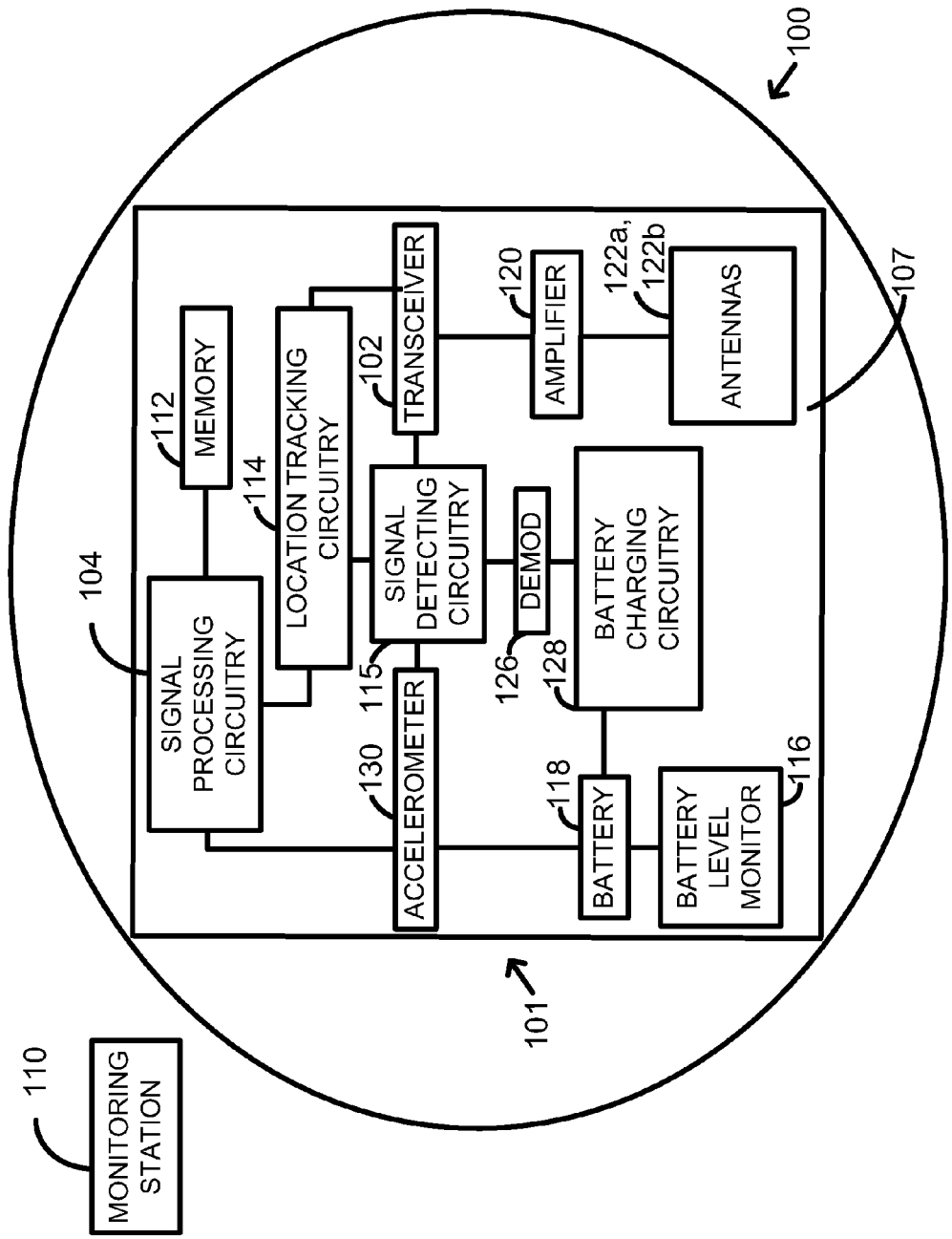
FIG. 1 illustrates a schematic of an electronic tracking device in accordance with an embodiment of the present invention.

Reference is now made to the drawings wherein like numerals refer to like parts throughout.

As used herein, the terms "location coordinates" refer without limitation to any set or partial set of integer, real and/or complex location data or information such as longitudinal, latitudinal, and elevational positional coordinates.

As used herein, the terms "tracking device" and "electronic tracking device" refer to without, limitation, to any hybrid electronic circuit, integrated circuit (IC), chip, chip set, system-on-a-chip, microwave integrated circuit (MIC), Monolithic Microwave Integrated Circuit (MMIC), low noise amplifier, power amplifier, transceiver, receiver, transmitter and Application Specific Integrated Circuit (ASIC) that may be constructed and/or fabricated. The chip or IC may be constructed ("fabricated") on a small rectangle (a "die") cut from, for example, a Silicon (or special applications, Sapphire), Gallium Arsenide, or Indium Phosphide wafer. The IC may be classified, for example, into analogue, digital, or hybrid (both analogue and digital on the same chip and or analog-to-digital converter). Digital integrated circuits may contain anything from one to millions of logic gates, invertors, and, or, nand, and nor gates, flipflops, multiplexors, etc. on a few square millimeters. The small size of these circuits allows high speed, low power dissipation, and reduced manufacturing cost compared with board-level integration.

As used herein, the terms "data transfer", "tracking and location system", "location and tracking system", "location tracking system", and "positioning system," refer to without limitation to any system, that transfers and/or determines location coordinates using one or more devices, such as Global Positioning System (GPS).

As used herein, the terms "Global Positioning System" refer to without limitation to any services, methods or devices that utilize GPS technology to determine position of a GPS receiver based on measuring a signal transfer time of signals communicated between satellites having known positions and the GPS receiver. A signal transfer time is proportional, to a distance of a respective satellite from the GPS receiver. The distance between a satellite and a GPS receiver may be converted, utilizing signal propagation velocity, into a respective signal transfer time. The positional information of the GPS receiver is calculated based on distance calculations from at least four satellites to determine positional information of the GPS receiver.

As used herein, the terms "wireless network" refers to, without limitation, any digital, analog, microwave, and millimeter wave communication networks that transfer signals from one location to another location, such as, but not limited to IEEE 802.11g, Bluetooth, WiMax, IS-95, GSM, IS-95, CGM, CDMA, wCDMA, PDC, UMTS, TDMA, and FDMA, or combinations thereof.

Major Features

In one aspect, the present invention discloses an apparatus and method, to provide an improved capability electronic tracking device. In one embodiment, the device provides electronic circuitry including an accelerometer to measure location coordinates without requiring GPS signaling. In this embodiment, location coordinates of an electronic tracking device are measured when the electronic tracking device is located in a partially enclosed structure, e.g., a building or parking lot, up to a fully enclosed structure. In one embodiment, the electronic tracking device conserves battery power when the device is partially or fully blocked access to location coordinates from one or more GPS satellites, e.g., a primary location tracking system. In yet another embodiment, accelerometer measures force applied to the electronic tracking device and provides an alert, message to a guardian or other responsible person. In one embodiment, the alert message includes location coordinates of the electronic tracking device and other information, e.g., magnitude or nature of force, as well as possibility of injury of an object or individual having the electronic tracking device. As described throughout the following specification, the present invention generally provides a portable electronic device configuration for locating and tracking an individual or an object.

Exemplary Apparatus

Figure 2:
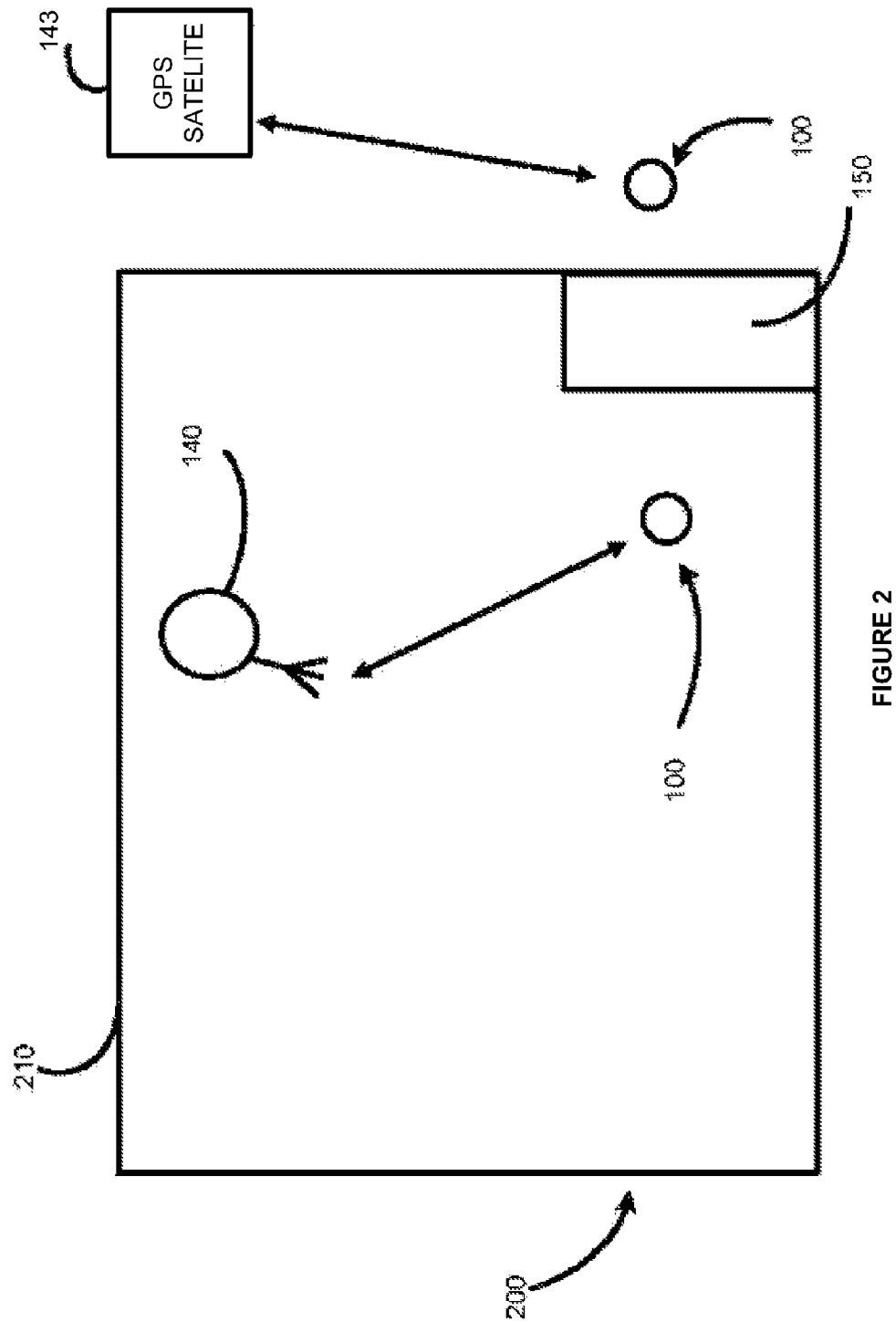
FIG. 2 illustrates a location tracking system associated with the electronic tracking device and the wireless network in accordance with an embodiment of the present invention.

Referring now to FIGS. 1-2 exemplary embodiments of the electronic tracking device of the invention are described in detail. Please note that the following discussions of electronics and components for an electronic tracking device to monitor and locate individuals are non-limiting; thus, the present invention may be useful in other electronic signal transferring and communication applications, such as electronic modules included in items such as: watches, calculators, clocks, computer keyboards, computer mice, and/or mobile phones to locate and track trajectory of movement and current location of these items within boundaries of or proximity to a room, building, city, state, and country.

Furthermore, it will be appreciated that while described primarily in the context of tracking individuals or objects, at least portions of the apparatus and methods described herein may be used in other applications, such as, utilized, without limitation, for control systems that monitor components such as transducers, sensors, and electrical, and/or optical components that are part of an assembly line process. Moreover, it will be recognized that the present invention may find utility beyond purely tracking and monitoring concerns. Myriad of other functions will be recognized by those of ordinary skill in the art given the present disclosure.

Electronic Tracking Device

Referring to FIG. 1, tracking device 100 contains various electronic components 101 such as transceiver 102, signal processing circuitry 104 (e.g., a microprocessor or other signal logic circuitry), and accelerometer 130. In one non-limiting example, the electronic components 101 are disposed, deposited, or mounted, on a substrate 107 (e.g., Printed Circuit Board (PCD)). The PCB 107, for example, may be manufactured from: polyacrylic (PA), polycarbonate (PC), composite material, and arylonitrile-butadiene-styrene (ABS) substrates, blends or combinations thereof, or the like (as described in more detail, in incorporated by reference U.S. patent application Ser. No. 11/933,024 filed on Oct. 31, 2007). The signal processing circuitry 104, in one example, associated with the tracking device 100 configured to store a first identification code, produce a second identification code, determine location coordinates, and generate a positioning signal that contains location data (as described in more detail in incorporated by reference U.S. patent application Ser. No. 11/753,979 filed on May 25, 2007). For instance, the location data includes longitudinal, latitudinal, and elevational position of a tracking device, current address or recent address of the tracking device, a nearby landmark to the tracking device, and the like. In one example, electronic tracking device 100 is portable and mobile and fits easily within a compact volume, such as standard pocket of an individual's shirt having approximate dimensions of 1.5 inch by 2.5 inch by 1.0 inch. In yet another example, electronic tracking device 100 may be one integrated circuit having dimensionality in the mm range in all directions (or even smaller).

In one embodiment, location tracking circuitry 114, calculates location data received and sends the data to signal processing circuitry 104. Memory 112 stores operating software and data, for instance, communicated to and from signal processing circuit 104 and/or location tracking circuitry 114, e.g., GPS logic circuitry. In one embodiment, a signal detecting circuitry 115 detects and measures signal power level. In another embodiment, the signal processing circuitry 104 processes and measures signal power level. Battery level detection circuitry (e.g., battery level monitor 116) detects a battery level of battery 118, which contains one or more individual units or a plurality of units grouped as a single unit.

In one non-limiting example, antennas 122a, 122b electrically couple to transceiver 102. In one variant, transceiver 102 includes one integrated circuit or, in another embodiment, may be multiple individual circuits or integrated circuits. Transceiver 102 communicates a signal including location data between tracking device 100 and the monitoring station 110, for example, by any of the following including: wireless network, wireless data transfer station, wired telephone, and Internet channel. A demodulator circuit 126 extracts baseband signals, for instance at 100 KHz, including tracking device configuration and software updates, as well as converts a low-frequency AC signal to a DC voltage level. The DC voltage level, in one example, is supplied to battery charging circuitry 128 to recharge a battery level of the battery 118. In one embodiment, a user of monitoring station 110, e.g., a mobile personal digital assistant, mobile phone, or the like, by listening (or downloading) one or more advertisements to reduce and/or shift, usage charges to another user, account, or database (as described in more detail in previous incorporated by reference U.S. patent application Ser. Nos. 11/784,400 and 11/784,318 each filed on Apr. 5, 2007).

In another embodiment, an accelerometer 130, for example, a dual-axis accelerometer 130, e.g. ADXL320 integrated circuit manufactured by Analog Devices having two substantially orthogonal beams, may be utilized. The data sheet ADXH320L from Analog Devices is incorporated by reference. In one embodiment, the accelerometer 130 activates upon one or more designated antenna(s), e.g., antennas 122a, 122b, detecting a first signal level, e.g., a low signal level or threshold value, as specified by, for instance, a user or system administrator. In one variant of this embodiment, electrical circuitry associated with GPS signal acquisition, e.g., all or a portion of amplifier block 120, may be, for instance, placed on standby or in a sleep mode. In another embodiment, the accelerometer 130 remains in a standby mode until, for instance, a system administrator, a specified time period, or a user activates the accelerometer 130. In one embodiment, the amplifier block 120 includes multiple electronic functions and blocks including a low noise amplifier, a power amplifier, a RF power switch, or the like, placed in a sleep or standby mode, for instance, to conserve a battery level of the battery 118.

In another variant of this embodiment, circuitry, such as amplifier block 120 or location tracking circuitry 114, may be placed in a sleep or standby mode to conserve a battery level of the battery 118. In one variant, the tracking device 100 periodically checks availability of GPS signal, e.g., performs a GPS signal acquisition to determine if a receive communication signal is above a first signal level. Referring to embodiment depicted in FIG. 2, electronic tracking device 100 exits an opening 150 in partially enclosed structure 210; thus, electronic tracking device 100 may resume GPS signal acquisition using GPS satellite 143 (e.g., in response to a periodic check by the tracking device 100 of a receive communication signal level above a first signal level).

In one embodiment, system administrator selects a signal noise bandwidth, e.g., within a range of 3 to 500 Hz, of the accelerator 130 to measure dynamic acceleration (e.g., due to vibration forces applied, to electronic tracking device 100). In another embodiment, system administrator selects a signal noise bandwidth, e.g., within a range of 3 to 500 Hz, to measure static acceleration (due to gravitational forces applied to electronic tracking device 100). In particular, external forces on electronic tracking device 100 cause, for example, internal structural movements, e.g., deflection of dual-axis beams, of the accelerometer 130. The deflection of dual-axis beams generates differential voltage(s).

Differential voltage(s) are proportional to acceleration measurements, e.g., discrete acceleration measurements, of electronic tracking device 100, for instance in x, y, and z directions. Differential voltage(s), in one instance, are relative to, for instance, last known GPS location coordinates of electronic tracking device 100. By performing electronic device proximity measurements, e.g., measuring acceleration vectors of electronic tracking device 100 at time intervals, e.g., T1, T2, T3 . . . TN, monitoring station 110 computes electronic tracking device velocity at time intervals, e.g., T1, T2, T3 . . . TN. In one embodiment, time intervals, e.g., T1, T2, and T3 . . . TN are measured in accordance with instructions by a system administrator or user. In one embodiment, time intervals are selected within a range of one micro-second to several minutes.

In one embodiment, the monitoring station 110 performs an integration of the acceleration measurements as a function of time to compute electronic tracking device velocity at time intervals, e.g., T1, T2, and T3 . . . TN. By referencing prior location coordinates, e.g., last known accurate location data of the electronic tracking device 100 or last known location data of nearby electronic tracking device (e.g., second tracking device 101 in proximity to electronic tracking device 100), monitoring station 110 computes a current location of electronic tracking device 100 utilizing electronic tracking device velocity computations. Advantageously, monitoring station 110, in an above described embodiment, uses above described device proximity measurements to monitor current location data of electronic tracking device 100 without connectivity to receive communication signals from GPS satellites.

In one embodiment, the monitoring station 110 may include a mobile phone having connectivity to wireless network 140 electrically coupled to electronic tracking device 100 (FIG. 2). In this variant, the wireless network 140 resides or circulates within at least a portion of a semi-enclosed, partially-enclosed, or fully enclosed structure, e.g., building, parking structure, closet, storage room, or the like (e.g., structure 210 in FIG. 2). Furthermore, in one embodiment, the present invention conserves battery power by placing on standby, low power mode, or disabling entirely GPS signal, acquisition, circuitry and other associated devices, e.g., all or a portion of amplifier block 120 including power amplifiers, LNAs, switches, and the like. Furthermore, during supplemental location coordinates tracking, e.g., electronic device proximity measurements, the transceiver circuitry (e.g., transceiver 102, location tracking circuitry 114, and signal, processing circuitry 104) consumes reduced battery power for GPS circuitry while the electronic tracking device 100 communicates displacement vectors (e.g., differential location coordinates) to monitoring station 110 (e.g., a mobile phone, a personal digital assistant) through a wireless network 140. As described above, when GPS signaling is not practicable, electronic device proximity measurements provide differential location coordinate information to calculate current location coordinate information.

In one embodiment, accelerometer, e.g., accelerometer 130, determines if electronic tracking device 100 in a stationary position for a period, for instance, designated by system administrator or user. For example, electronic tracking device 100 may be, for example, located on a counter top, within, a pocket of clothing, or in suitcase, not being moved, or not currently in use. Continuing with this embodiment, electronic tracking device 100 communicates a code, e.g., a stationary acknowledgement code, to communication network, e.g., wireless network 140. In one variant, when or if monitoring station 110 requests location data through communication network, electronic tracking device 100 determines whether it is located in a stationary or substantially stationary position and electronic tracking device 100 communicates its last-known location to the monitoring station 110 without accessing or requiring GPS signaling or active GPS circuitry, e.g., location tracking circuitry 114. Advantageously, in this embodiment, when electronic tracking device 100 does not utilize and require GPS circuitry, e.g., location tracking circuitry 114, or functionality, the power resources are preserved of battery 118 in contrast to many conventional GPS communication systems, which continue powering-on GPS circuitry. In one embodiment, electronic tracking device 130 associated with a person or object remains at a substantially stationary position approximately one-fourth to one-third of a calendar day; thus, this feature of not accessing GPS circuitry preserves battery power.

In another embodiment, an accelerometer, such as accelerometer 130, detects tapping against electronic tracking device 100. For instance, upon wake-up, user prompt, system, administrator prompt, or active, accelerometer 130 detects a person or object tapping a sequence on electronic tracking device 100. In one embodiment, electronic tracking device 100 includes digital signal programming circuitry (such as of signal, processing circuitry 104). The digital signal programming circuitry recognizes programmed motions received by accelerometer, such as accelerometer 130, and transmits an alert message to the monitoring station 110 upon receiving a recognized motion pattern. For example, electronic tracking device 100 may be programmed to recognize an "SOS tap cadence". Thus, it electronic tracking device 100 is repeatedly tapped, for instance, in a "dot-dot-dot, dash-dash-dash, dot-dot-dot" pattern, signal processing circuitry 104 recognizes a motion pattern and transmit an alert message to wireless network 114 to monitoring station 110. In one instance, alert message may be associated with a distress pattern and may require an appropriate response. In one variant, the accelerometer may recognize when an object or individual spins or turns motion of electronic tracking device 100. Continuing with this embodiment, signal processing circuitry 104 recognizes programmed motions, and transceiver 102 transmits an alert message to wireless network 114 associated with programmed motions. In another variant, electronic tracking device 100 is programmed to recognize other motion patterns, such as when it is tumbled or flipped. Depending upon duration, time, or cadence of these movements or motion patterns, electronic tracking device 100 communicates an alert message to the wireless network 114. In one variant, wireless network 114 performs an appropriate action, such as communicating information signal to monitoring station 110.

In another example, physical impacts on electronic tracking device 100 are measured to determine if an individual or object may be injured. In one embodiment, magnitude of displacement vectors may be measured by one or more accelerometers, such as accelerometer 130, disposed at various inclinations and orientations, e.g., disposed substantially orthogonal to one another. Continuing with this embodiment, when a measured physical impact is above a predetermined level, an object or individual associated with electronic tracking device 100 may have suffered a fall or be in need of medical attention. In one variant of this embodiment, a user (e.g., a system administrator, or person located in a contact book) at monitoring station 110 becomes alerted, e.g., by text message, email, or voice mail (as more fully described in previously incorporated by reference U.S. patent application Ser. No. 11/935,901 filed on Nov. 6, 2007, entitled "System and Method for Creating and Managing a Personalized Web Interface for Monitoring Location Information on Individuals and Objects Using Tracking Devices"). In one variant of this embodiment, if a user does not affirmatively respond, another individual, guardian, medical personnel, or law enforcement officer is contacted by monitoring station 110 (as more fully described in Ser. No. 11/935,901). In yet another variant of this embodiment, monitoring station 110 continues to contact individuals until the alert message is affirmatively answered.

Battery Conservation

Figure 3:
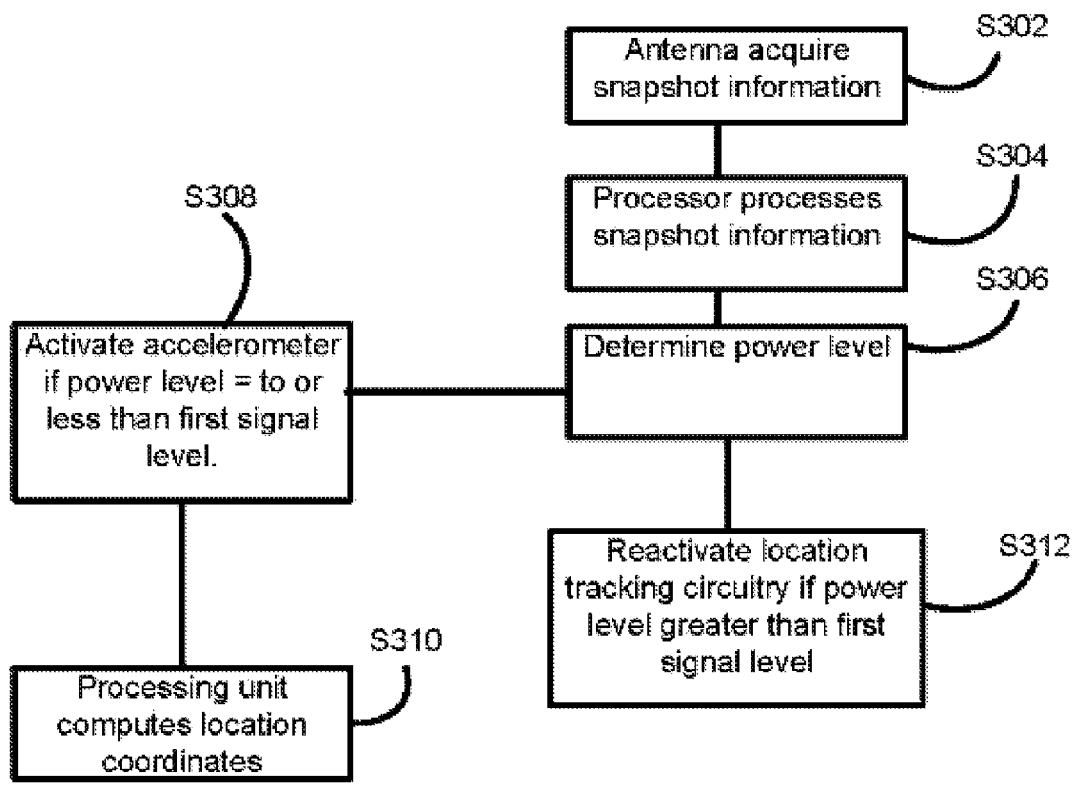
FIG. 3 illustrates a flow diagram to manage and control circuitry associated with the electronic tracking device of FIGS. 1 and 2 in accordance with an embodiment of the present invention.

Referring to FIG. 3, a flow chart 300 illustrates battery conservation for electronic tracking device 100 as described in FIGS. 1, 2 in accordance with one embodiment of the present invention. In step 302, antenna 122a associated with electronic tracking device 100 acquires a snapshot of receive communication signal including location coordinates data. In step 304, processing unit 104 processes the snapshot of receive communication signal including location coordinates data. In step 306, processing unit 104 determines a power level of receive communication signal.

In step 308, accelerometer 130 activates if a power level of the receive communication signal is insufficient for processing. In one variant of step 308, accelerometer 130 measures acceleration of electronic tracking device 100 at time intervals, e.g., T1, T2, T3 ... TN.

In step 310, processing unit 104 computes current location coordinates using acceleration measurements. In step 312, all or a portion of amplifier block 120 and associated circuitry, e.g., location tracking circuitry, are activated at selected time intervals to determine if receive communication signal is of sufficient signal strength. In one variation of step 312, upon determining receive communication signal of sufficient signal strength, location tracking circuitry 114 are activated, and processing unit 104 determines location coordinates from the receive communication signal. In another variation of step 312, upon determining receive communication signal of sufficient signal strength, accelerometer 130 is deactivated and location tracking circuitry 114 are activated, and processing unit 104 determines location coordinates from the receive communication signal.

It is noted that many variations of the methods described above may be utilized consistent with the present invention. Specifically, certain steps are optional and may be performed or deleted as desired. Similarly, other steps (such as additional data sampling, processing, filtration, calibration, or mathematical analysis for example) may be added to the foregoing embodiments. Additionally, the order of performance of certain steps may be permuted, or performed in parallel (or series) if desired. Hence, the foregoing embodiments are merely illustrative of the broader methods of the invention disclosed herein.

While the above detailed description has shown, described, and pointed out novel features of the invention as applied to various embodiments, it will be understood that various omissions, substitutions and changes in the form and details of the device or process illustrated may be made by those skilled in the art without departing from the spirit of the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A method to control power usage comprising:
    measuring a receive communication signal level by primary location tracking circuitry of an electronic tracking device communicated by a primary location tracking system;
    reducing applied power level to the primary location tracking circuitry in response to measurement of a receive communication signal level less than a first signal level;
    increasing applied power level to supplemental location tracking circuitry response to measurement of the receive communication signal less than the first signal level;
    determining differential positional measurements based in part on acceleration measurements of supplemental location tracking circuitry associated with a secondary location tracking system; and
    determining positional coordinates of electronic tracking device responsive to a known reference coordinate values and the differential positional measurements.

2. The method of claim 1, wherein the receive communication signal less than a first signal level comprises an attenuated receive communication signal less than a first signal level in response to the electronic tracking device moving to at least one of a partially enclosed or substantially enclosed structure at least partially blocked from communication with the primary location tracking system.

3. The method of claim 1, further comprising the steps of:
    reactivating the primary location tracking circuitry in response to measurement of the receive communication signal above the first signal level;
    wherein the primary location tracking system comprises a wireless location tracking system;
    wherein the supplemental location tracking system comprises an accelerometer; and
    wherein the known reference coordinate values comprise last known coordinate values of the electronic tracking device.

4. The method of claim 1, wherein the primary location tracking circuitry is configured to communicate with a satellite based location tracking system.

5. The method of claim 1, wherein the primary location tracking circuitry is configured to communicate with at least one of a portable wireless communication device, another tracking device, or a wireless communication monitoring station.

6. The method of claim 1, wherein the supplemental location tracking circuitry is configured to communicate with at least one of a portable wireless communication device, another tracking device, or a wireless communication monitoring station.

7. A method to control power usage comprising:
measuring a receive communication signal level by primary location tracking circuitry of an electronic tracking device communicated by a primary location tracking system;
adjusting applied power levels to the primary location tracking circuitry and supplemental location tracking circuitry in response to measurement of a receive communication signal level relative to a predetermined signal level;
determining differential positional measurements based in part on acceleration measurements of supplemental location tracking circuitry associated with a secondary location tracking system; and
determining positional coordinates of electronic tracking device responsive to a known reference coordinate values and the differential positional measurements.

8. The method of claim 7, wherein the receive communication signal comprises an attenuated receive communication signal less than the predetermined signal level in response to the electronic tracking device moving to at least one of a partially enclosed or substantially enclosed structure at least partially blocked from communication with the primary location tracking system.

9. The method of claim 7, wherein the primary location tracking circuitry is activated in response to a measurement of the receive communication signal being above the predetermined signal level.

10. The method of claim 7, wherein the primary location tracking circuitry is deactivated in response to a measurement of the receive communication signal being below the predetermined signal level.

11. The method of claim 7, wherein the supplemental location tracking circuitry is activated in response to a measurement of the receive communication signal being below the predetermined signal level.

12. The method of claim 7, wherein the supplemental location tracking circuitry is deactivated in response to a measurement of the receive communication signal being above the predetermined signal level.

13. The method of claim 7, wherein the primary location tracking system comprises a wireless location tracking system, the supplemental location tracking system comprises an accelerometer, and the known reference coordinate values comprise last known coordinate values of the electronic tracking device.

14. The method of claim 7, wherein the primary location tracking circuitry is configured to communicate with a satellite based location tracking system.

15. The method of claim 7, wherein the primary location tracking circuitry is configured to communicate with at least one of a portable wireless communication device, another tracking device, or a wireless communication monitoring station.

16. The method of claim 7, wherein the supplemental location tracking circuitry is configured to communicate with at least one of a portable wireless communication device, another tracking device, or a wireless communication monitoring station.

17. A portable electronic tracking device to monitor location coordinates of one or more individuals and objects, the device comprising:
primary location tracking circuitry to measure a receive communication signal level communicated by a primary location tracking system and received by the electronic tracking device;
supplemental location tracking circuitry to determine positional measurements based in part on measurements associated with a secondary location tracking system; and
a battery power monitor configured to:
reduce applied power level to the primary location tracking circuitry in response to measurement of a receive communication signal level less than a first signal level; and
increase applied power level to supplemental location tracking circuitry response to measurement of the receive communication signal less than the first signal level;
wherein the electronic tracking device is configured to determine positional coordinates responsive to a known reference coordinate values and the differential positional measurements.

18. The device of claim 17, wherein the primary location tracking circuitry is configured to communicate with a satellite based location tracking system.

19. The device of claim 17, wherein the primary location tracking circuitry is configured to communicate with at least one of a portable wireless communication device, another tracking device, or a wireless communication monitoring station.

20. The device of claim 17, wherein the supplemental location tracking circuitry is configured to communicate with at least one of a portable wireless communication device, another tracking device, or a wireless communication monitoring station.

* * * * *